(No Model.)
W. T. HEYLMAN.
BUFF WHEEL.
No. 520,679. Patented May 29, 1894.
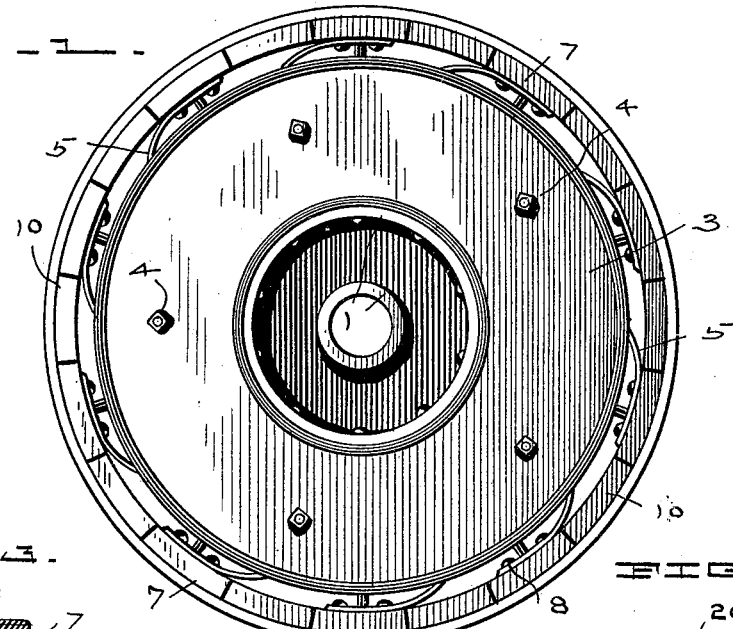
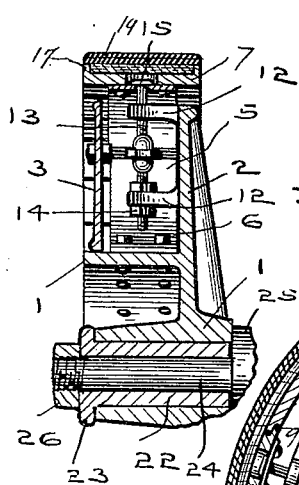
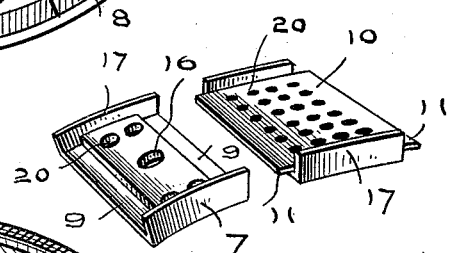
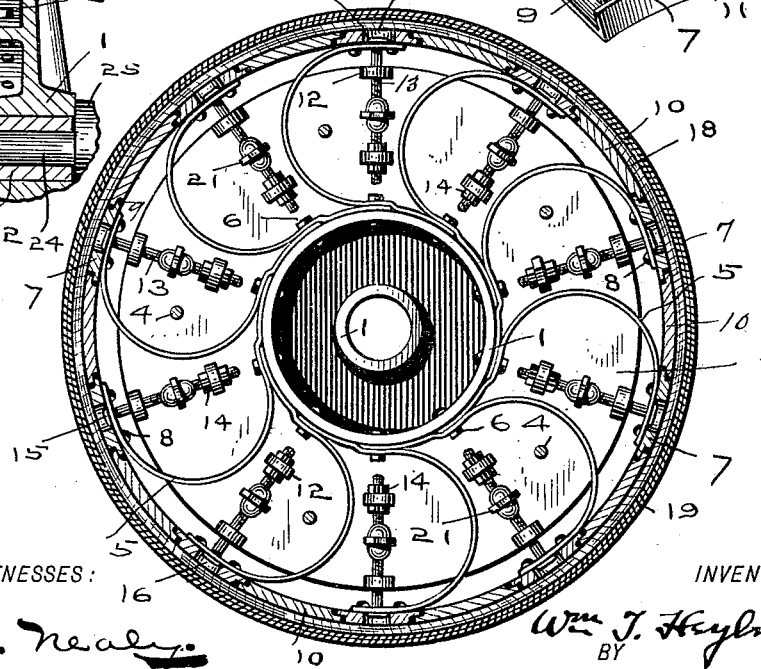
WITNESSES:
H. F. Nealy
C. P. Greene
INVENTOR
Wm. T. Heylman
BY T. H. Lockwood
His ATTORNEY.
THE NATIONAL LITHOGRAPHING COMPANY,
WASHINGTON, D. C.

UNITED STATES PATENT OFFICE.

WILLIAM T. HEYLMAN, OF MUNCIE, INDIANA.

BUFF-WHEEL.

SPECIFICATION forming part of Letters Patent No. 520,679, dated May 29, 1894.

Application filed November 15, 1893. Serial No. 491,069. (No model.)

*To all whom it may concern:*

Be it known that I, WILLIAM T. HEYLMAN, of Muncie, county of Delaware, and State of Indiana, have invented certain new and useful Improvements in Buff-Wheels; and I do hereby declare that the following is a full, clear, and exact description thereof, reference being had to the accompanying drawings, in which like figures refer to like parts.
My invention relates to a buff-wheel so constructed that its surface or tire will be very yielding and resilient, and the wheel can be readily and accurately balanced. It is well known that solid buff-wheels which have no yielding surface or which are not accurately balanced, will heat and destroy the surface or tire of the wheel as well as take the temper out of the object being treated.

The chief object of my invention, therefore, is to overcome these two difficulties and thus prevent heating of the tire or surface of the wheel and the object being treated. I accomplish this object by making the rim sectional and mounting it upon springs which are preferably elliptic, and mounted upon the hub. Solid wheels, if not perfectly balanced, will bounce and make an uneven and irregular surface. This construction will make the surface of the wheel somewhat soft and resilient and avoid the above difficulty. In order to assist in attaining this object I also place between the outer leather surface or tire and the sectional rim, a cushion composed of any resilient material, for the purpose of enabling the surface to give at any place where it might be touched.

Another feature of my invention consists in perforating the rim for the purpose of keeping the tire from heating.
Another feature of my invention consists in providing a wheel with a number of adjustable balancing weights which are easily adjusted, for the purpose of keeping the wheel always very accurately and truly balanced.

Another feature of my invention consists in providing the hub of my wheel with a headed sleeve which holds the wheel snugly in place and can be bored out and readily adapted to any sized mandrel. It is desirable to manufacture these wheels independent of the mandrel upon which they are to be mounted and it is therefore necessary to provide a sleeve substantially like the one herein shown for the purpose of adapting the wheel to any sized mandrel.

The full nature of my invention will appear from the following description and the drawings made a part hereof.

Figure 1 is a side elevation of my wheel. Fig. 2 is a central annular section of the same. Fig. 3 is a cross section of the upper part of the same, the lower part being broken away. Fig. 4 are two sections of my wheel rim.

I provide a hollow hub 1 which is preferably integral with the side 2 of my wheel. 3 is the other side of the wheel, the two sides being bolted together by the bolts 4 extending from one side to the other through the wheel. On the hub 1, I mount elliptic springs 5, preferably by allowing the ends secured to the hub to overlap each other as shown in Fig. 2, and bolting them to the hub 1 by the bolts 6, in two places, one near the end of the spring and the other at the point where the spring leaves the hub. On the outer end of the elliptic springs I mount the sections 7 of the rim by means of the bolts 8. The sections 7 are provided at their edges on the under side with lips 9. Between these sections 7 of the wheel rim that are mounted upon the springs 5 are fitted other sections 10 of the wheel rim, that are provided with corresponding lips 11 at their edges on the upper side adapted to overlap the lips 9 on the other sections 7 of the wheel rim, as shown in Fig. 2, and thereby make the wheel rim continuous. The joint between these two kinds of sections 7 and 10 is such that the two may have some play in order that the rim will be flexible and therefore will yield when pressed upon. In order to hold the sectional rim of the wheel in place I provide on the side 2 of my wheel inwardly extending lugs 12, in which I mount a bolt 13, provided with set screws 14, whose outward head or end fits in the aperture 16 in the sections 7 of the wheel rim. The head 15 must fit loosely within the hole 16 in order that the wheel rim and sections 7 may have some play independent of the bolt 13, but the bolt 13 will prevent the wheel rim from having too much lateral or longitudinal play. The sections 7 and 10 of my wheel rim I provide with flanges 17, which, when the wheel rim is completed, form on each side of the rim a continuous outwardly extending flange. It will be observed in Fig. 4 that the flange of the section 7 extends to the outer edge of the under lip 9, while the flange on the section 10 extends only to the upper lip 11. By this construction when the sections are united together they are to a large extent prevented from having lateral movement, thus giving the completed rim lateral strength. The purpose of these flanges 17 is to inclose and hold in place a cushion 18 which surrounds the wheel rim. This cushion 18 is made preferably of rubber or woolen goods, but may be made of any yielding or resilient material, its purpose being to form a yielding base or cushion for the outer surface or tire 19. In order to keep the tire 19 cool I perforate the sections 7 and 10 of my wheel rim at 20, as shown in Fig. 4. These perforations admit the air to the parts that are liable to become heated, whereby they are kept cool.

In order to keep the wheel perfectly and accurately balanced I provide weights 21 which I mount upon the bolts 13, the bolts and weights being threaded so that the weights can be readily adjusted by screwing them inward or outward. In order to enable my wheel to be mounted upon mandrels or axles of different sizes and to hold the wheel snugly in place, I provide the sleeve 22, having at one end the flange or head 23. The sleeve is adapted to fit within the hub 1, as shown in Fig. 3, and is made shorter than the hub, so that the nut 26 when set up on the mandrel will cause the head 23 of the sleeve to draw the hub of the wheel up snugly to the shoulder 25 of the mandrel.

What I claim as my invention, and desire to secure by Letters Patent, is the following:

1. The combination in a buff wheel, of a hub, a flexible rim, a number of springs secured to the hub and adapted to support the rim, a side frame mounted on the hub, and weights radially adjustable secured to such side frame, substantially as shown and described.

2. In a buff wheel, a rim formed of sections, and springs mounted upon the hub and adapted to support the rim, every alternate section of the rim being secured to a spring and provided with under lips, and the other sections of the rim provided with over lips adapted to engage the under lips of the secured sections, substantially as shown and described.

3. In a buff wheel, a rim formed of sections, and springs mounted on the hub and adapted to support the rim, every alternate section of the rim being provided with under lips and radial side flanges longitudinally extending to the outer edge of the lips, and the other sections of the rim provided with over lips adapted to engage the under lips of the secured sections and having side flanges longitudinally extending to the lips, substantially as shown and described.

4. In a buff wheel, a flexible rim provided with apertures, lugs extending inwardly from the side of the wheel, and bolts adjustably mounted in such lugs, the heads of the bolts adapted to fit loosely within the apertures in the rim, substantially as and for the purpose shown and described.

5. In a buff wheel, a rim formed of perforated sections so connected with each other as to make the rim continuous and flexible, springs upon which such rim is mounted, a cushion mounted upon such rim, and a tire mounted upon such cushion, substantially as shown and described.

6. In a buff wheel, a flexible rim provided with apertures, lugs extending inwardly from the side of the wheel, bolts adjustably mounted in such lugs, the heads of the bolts adapted to fit loosely within the apertures in the rim, and weights adjustably mounted on such bolts, substantially as shown and described.

7. A buff wheel consisting of a hub, a rim formed of perforated sections, the engaging sections being provided with overlapping lips, flat elliptic springs each secured to the hub at more than one point, and at their outward ends secured to every alternate section of the wheel rim, a cushion mounted on such rim, and a tire on such cushion, a side frame secured to the hub, and a weight radially adjustable secured to such side frame, all combined substantially as shown and described.

In witness whereof I have hereunto set my hand this 19th day of October, 1893.

WILLIAM T. HEYLMAN.

Witnesses:
V. H. LOCKWOOD,
N. D. TILFORD.